(12) United States Patent
Hauck et al.

(10) Patent No.: US 6,807,611 B2
(45) Date of Patent: Oct. 19, 2004

(54) HIGH SPEED SELECTIVE MIRRORING OF CACHED DATA

(75) Inventors: Edward Lewis Hauck, Niwot, CO (US); Noel Simen Otterness, Lafayette, CO (US)

(73) Assignee: International Business Machine Corporation, Armonk, NY (US)

( * ) Notice: Subject to any disclaimer, the term of this patent is extended or adjusted under 35 U.S.C. 154(b) by 295 days.

(21) Appl. No.: 10/116,945

(22) Filed: Apr. 5, 2002

(65) Prior Publication Data

US 2003/0191921 A1 Oct. 9, 2003

(51) Int. Cl.[7] .............................................. G06F 12/02
(52) U.S. Cl. ....................... 711/162; 711/114; 711/119; 711/161; 711/168
(58) Field of Search ............................... 711/114, 119, 711/161, 108, 162, 168

(56) References Cited

U.S. PATENT DOCUMENTS

| | | | | |
|---|---|---|---|---|
| 5,617,348 A | * | 4/1997 | Maguire ...................... 365/49 |
| 5,737,756 A | * | 4/1998 | White et al. ................ 711/142 |
| 5,819,308 A | | 10/1998 | Tien et al. .................. 711/108 |
| 5,841,874 A | | 11/1998 | Kempke et al. .............. 380/50 |
| 6,023,466 A | | 2/2000 | Luijten et al. ............... 370/395 |
| 6,049,857 A | | 4/2000 | Watkins ..................... 711/207 |
| 6,052,683 A | | 4/2000 | Irwin ........................... 707/8 |
| 6,078,987 A | | 6/2000 | Kongetira ................... 711/108 |
| 6,097,724 A | | 8/2000 | Kartalopoulos ............. 370/395 |
| 6,121,646 A | | 9/2000 | Higuchi et al. ............. 257/213 |
| 6,134,135 A | | 10/2000 | Andersson ................... 365/49 |
| 6,226,710 B1 | | 5/2001 | Melchior ..................... 711/108 |
| 6,286,091 B1 | * | 9/2001 | Park ........................... 711/207 |
| 6,405,284 B1 | * | 6/2002 | Bridge ........................ 711/114 |
| 6,535,951 B1 | * | 3/2003 | Ross ........................... 711/108 |
| 6,574,709 B1 | * | 6/2003 | Skazinski et al. ........... 711/119 |
| 6,694,406 B2 | * | 2/2004 | Kodama et al. ............ 711/114 |
| 2001/0005876 A1 | | 6/2001 | Srinivasan et al. ......... 711/108 |

FOREIGN PATENT DOCUMENTS

EP 0 428 079 A2 5/1991 ........... G06F/12/10

\* cited by examiner

*Primary Examiner*—T Nguyen
(74) *Attorney, Agent, or Firm*—Brian C. Kunzler; Arthur J. Samodovitz (57) ABSTRACT

A mirror table that facilitates selective data coherency between local memory segments and remote memory segments includes a content addressable memory (CAM) and a random access memory (RAM). The CAM stores the addresses of local memory segments that are selected to be mirrored, and provides a segment index when presented with a segment address stored therein. The RAM stores one or more remote segment addresses for the mirrored segments along with additional data, and provides the remote segment addresses along with the additional data when presented with the segment index. A mirror link assembles and transmits an update packet comprising the remote segment addresses, a segment offset, the corresponding data, and the additional data to a remote destination. Each indicated remote address is updated with the corresponding data, thus maintaining data coherency between the selected local and remote memory segments.

15 Claims, 8 Drawing Sheets

HIGH SPEED SELECTIVE MIRRORING OF CACHED DATA

BACKGROUND OF THE INVENTION

1. The Field of the Invention

The invention relates to maintaining data coherency in computing systems and networks generally. Specifically, the invention relates to maintaining data coherency among redundant RAID controllers.

2. The Relevant Art

Data is often stored remotely and accessed by multiple computers and other electronic devices on electronic networks. Within a single computing device, multiple subsystems may access a common segment of data. A well-known technique to lower access latency and increase transfers rates is to locally store or "cache" frequently accessed data within fast local memory thus reducing the load on relatively slow transmission channels, links, and storage devices. Caching facilitates faster access speeds by temporarily storing the data of interest on the local system or device.

Caching often results in data records and files, or portions thereof, being distributed in disparate locations. Updating cached data records and files properly is problematic and is known in the art as maintaining cache coherency. Maintaining cache coherency typically involves tracking and monitoring of the various cached versions in a central register or database and sending update messages to update old data at the various disparate locations. Tracking, monitoring and updating is expensive in that considerable processing cycles and/or specialized circuitry is required to maintain cache coherency.

RAID systems (i.e. systems using Redundant Arrays of Independent Disks) are used to store large quantities of data within computer and storage networks. RAID systems are designed to be fault resistant and fault tolerant by distributing data among redundant arrays of independent disks usually with some form of error coding. RAID controllers are typically required to receive write requests and write data from a host, acknowledge reception, encode the data, and send it to a disk array for storage. To prevent a weak link within RAID systems, RAID controllers often operate in a dual active configuration where the controllers are paired in order to take over for each other in the event that one of the controllers fails.

Mirroring is a specific form of caching that is often conducted to maintain redundant copies and thereby facilitate recovering from system errors and failures. Mirroring is particularly desirable in active standby RAID controllers in that a standby controller must have a copy of certain segments of a failed controller's data to successfully recover from a failure and ensure that all write requests are successfully completed.

Mirroring is generally an expensive and time consuming operation. Mirroring requires that update messages must be generated, received, and processed for every data element that is updated within a cache. The time needed to generate, receive, and process update messages increases a RAID system's vulnerability to unrecoverable errors. Furthermore, certain data segments are not needed to recover from errors resulting in needless copying. What is needed is low-cost high-speed apparatus and method for selectively mirroring cached data. Such an apparatus and method is particularly needed in redundant RAID controllers.

OBJECTS AND BRIEF SUMMARY OF THE INVENTION

The apparatus of the present invention has been developed in response to the present state of the art, and in particular, in response to the problems and needs in the art that have not yet been fully solved by currently available data mirroring systems. Accordingly, it is an overall object of the present invention to provide an improved apparatus and method for mirroring cached data that overcomes many or all of the above-discussed shortcomings in the art.

To achieve the foregoing object, and in accordance with the invention as embodied and broadly described herein in the preferred embodiments, an improved apparatus and corresponding method for mirroring cached data is provided. In preferred embodiments, the described apparatus includes a mirror table and a mirror link.

The mirror table preferably comprises a CAM (content addressable memory) and a RAM (random access memory). The CAM stores a segment address for those local memory segments that are selected to be mirrored. The RAM stores the address of remote memory segments that correspond to the mirrored local memory segments, along with additional data such as a segment descriptor. The corresponding segment addresses within the CAM and the RAM are stored at corresponding addresses within each memory.

In operation, the CAM receives a segment address and returns the index of the mirrored segment address along with a segment hit signal indicating that the segment is a mirrored segment. The segment hit signal is not activated for segment addresses that are not within the CAM. The index returned by the CAM is used to access the address of the corresponding remote memory segments stored within the RAM.

The mirror table effectively partitions memory into segments and maps the address of selected segments within a local memory to the address of mirrored segments within remote memories. The mirror table is selectively engaged in that only those segments that are selected as mirrored segments are mapped to remote memory segments. The size of the mapped segments is also selectable and need not be the same on the local and remote systems.

The mirror link receives the remote addresses along with the corresponding data as well as the additional data such as a segment descriptor and transmits the received elements to the remote destination. Upon reception at the remote destination, the indicated remote address is updated with the corresponding data, thus maintaining data coherency between the selected local and remote memory segments. The additional data received by the remote destination may be used in a manner that is useful to the system in which it is deployed. For example, the additional data may be used to conduct messaging, transfer control information, perform housekeeping, or the like.

The described invention, may be used within dual active RAID controllers to provide reliable, low-cost, and high-speed means to mirror data packets sent to one of a plurality of controllers for storage within the redundant array of independent disks. The mirroring of data facilitates reliable completion of write requests in the event of a controller failure. The resulting invention may also be applied to other systems where selective data coherency is desired.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
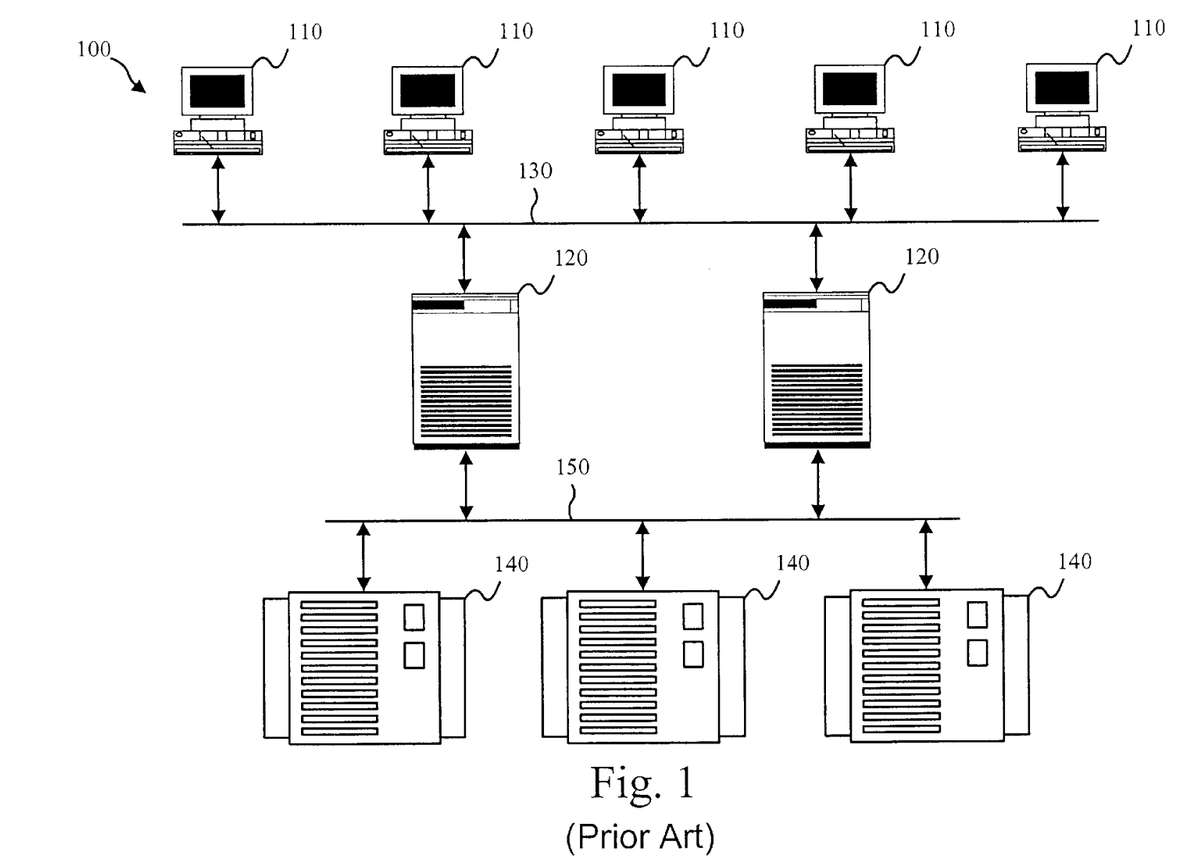
FIG. 1 is a block diagram illustrating a representative RAID network in accordance with the present invention.

FIG. 1 shows a representative RAID network 100 suitable for use with the present invention. The RAID network 100 as shown includes a number of workstations 110 and servers 120 interconnected by a local area network 130. The servers 120 may be configured to provide specific services such as print services, storage services, Internet access, or the like.

In the depicted embodiment, the servers 120 provide storage services to the local area network 130 via one or more storage arrays 140. The servers 120 are interconnected with the storage arrays 140 through a storage network 150. In one embodiment, the storage network 150 is a local area network in which the servers 120 and the storage arrays 140 are housed within the same facility or campus. In another embodiment, the storage network 150 is a wide area network with the servers 120 and the storage arrays 140 housed in geographically disparate locations. The storage arrays 140 are preferably redundant arrays of independent disks i.e. RAID storage.

Figure 2:
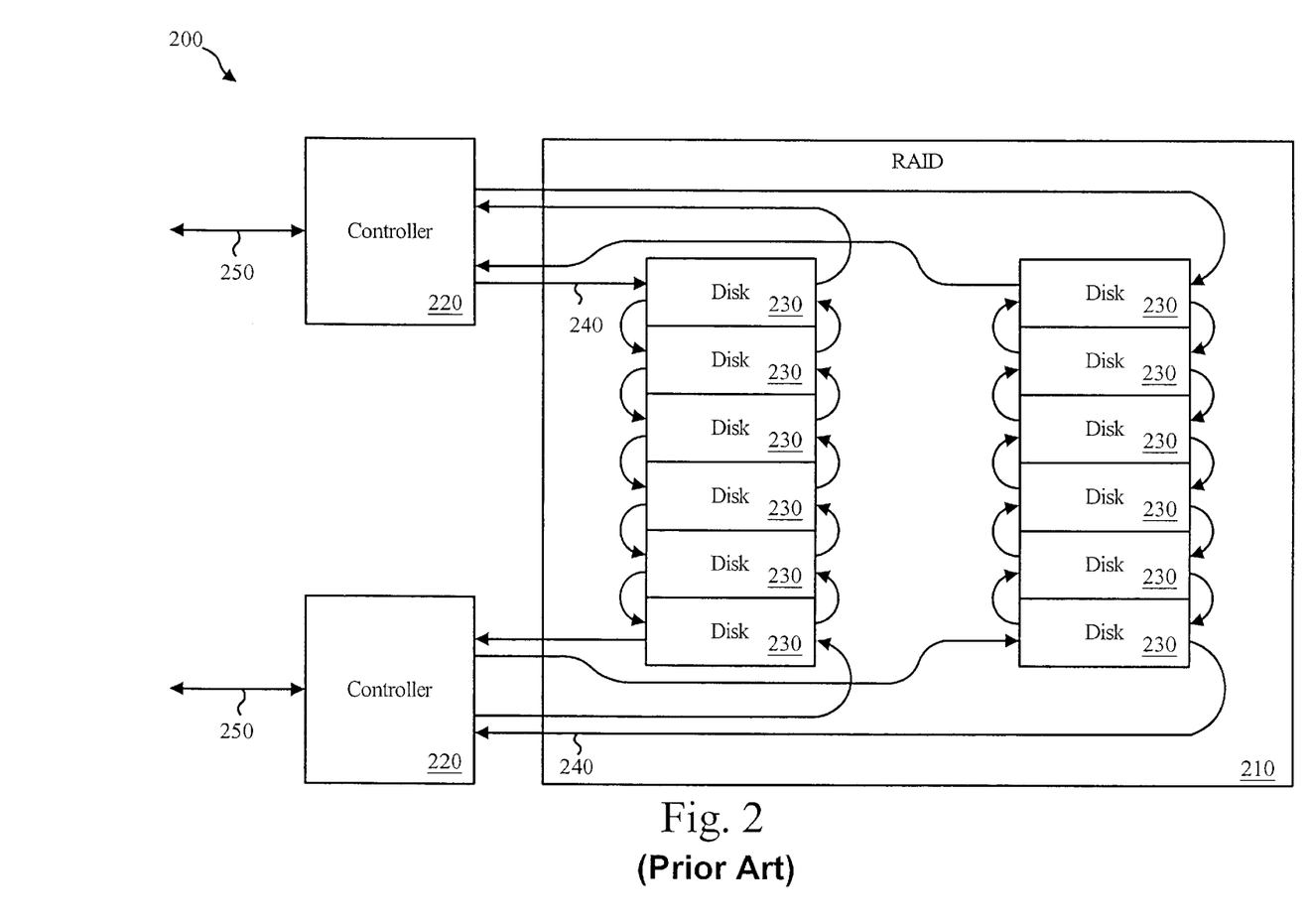
FIG. 2 is a block diagram illustrating a representative RAID system with dual active controllers in accordance with the present invention.

FIG. 2 shows one example of a RAID system 200 illustrating the need for the present invention. The RAID system 200 includes a storage array 210 and one or more RAID controllers 220. The RAID system 200 preferably includes a plurality of RAID controllers 220 in order to achieve increased reliability through redundancy. The storage array 210 is also preferably redundant though the inclusion of a plurality of storage devices 230.

In the depicted embodiment the storage devices 230 are interconnected with a pair of array loops 240. The array loops 240 also interconnect the RAID controllers 220 with the storage array 210. The array loops 240 circulate communications in complimentary directions to increase reliability. In the depicted embodiment, the array loops 240 are point-to-point loops such as that defined by the fiber channel standard.

In the depicted embodiment, the storage devices 230 and the RAID controllers 220 are dual ported devices capable of communicating on either array loop 240. Thus, both controllers are connected to all of the disk drives and are configured to conduct back-end communications on the same buses on which data transfer occurs. Bi-directional communication provides communication redundancy and enables the RAID system 200 to fully function despite the failure of any single element within the RAID system 200.

In the depicted embodiment, the RAID controllers 220 each support a host connection 250. The RAID controllers 220 receive access requests via the host connection 250 and service those requests by transferring blocks of data to and from the storage array 210. The blocks of data that are transferred to the storage array 210 are redundantly encoded to permit error detection and data recovery in the event one of the storage devices 230 fail. In certain preferred embodiments, each RAID controller 220 is configured with multiple host connections 250. Additional host connections facilitate a wider variety of connection topologies within a network, and also provide increased reliability due to the additional connection redundancy.

In addition to connection and data redundancy, the RAID controllers 220 preferably support some type of fail-over mechanism. In one embodiment, for example, each of the RAID controllers 220 is a primary controller for the host on the host connection 250 as well as a standby controller for other RAID controllers. One of the standby controllers is activated to assume the load of the primary controller in the event the primary controller fails. In another embodiment, the RAID controllers 220 support load sharing. If a failure occurs in one of the RAID controllers 220, the remaining RAID controllers 220 pick up additional traffic load via the host connection 250.

In one embodiment, a switch device is used to connect the controllers to the hosts. In the event one of the RAID controllers 220 fails, the failed controller is bypassed, and host communications along the host connection 250 to which it is attached are directed to the standby RAID controllers 220. Thus, in such an embodiment, redundant connections on the host side are unnecessary, as all communications occur on the storage side where the captive (non shared) bus for the storage system resides. In another embodiment, a host conducts alternate path failover in the event of a failed controller. Alternate path failover may comprise invoking an alternate path driver to redirect host requests to one or more healthy controllers.

In the preferred embodiment, the RAID controllers 220 support data caching via an on-board storage cache. On-board storage cache improves the performance of the RAID system 200. In the event of a power failure, unwritten data is flushed from the storage cache to the storage array 210, while the RAID controller 220 operates on backup power.

To facilitate quick and reliable recovery in the event of a RAID controller failure, the storage cache on each RAID controller 220 preferably contains mirrored data from one or more other RAID controllers 220. While data mirroring potentially improves system reliability and performance, data mirroring mechanisms and methods have proven costly and cumbersome to deploy within RAID systems. The ability to mirror data in a low-cost high speed manner is a primary objective of the present invention that will be presented in greater detail in the subsequent Figures.

Figure 3:
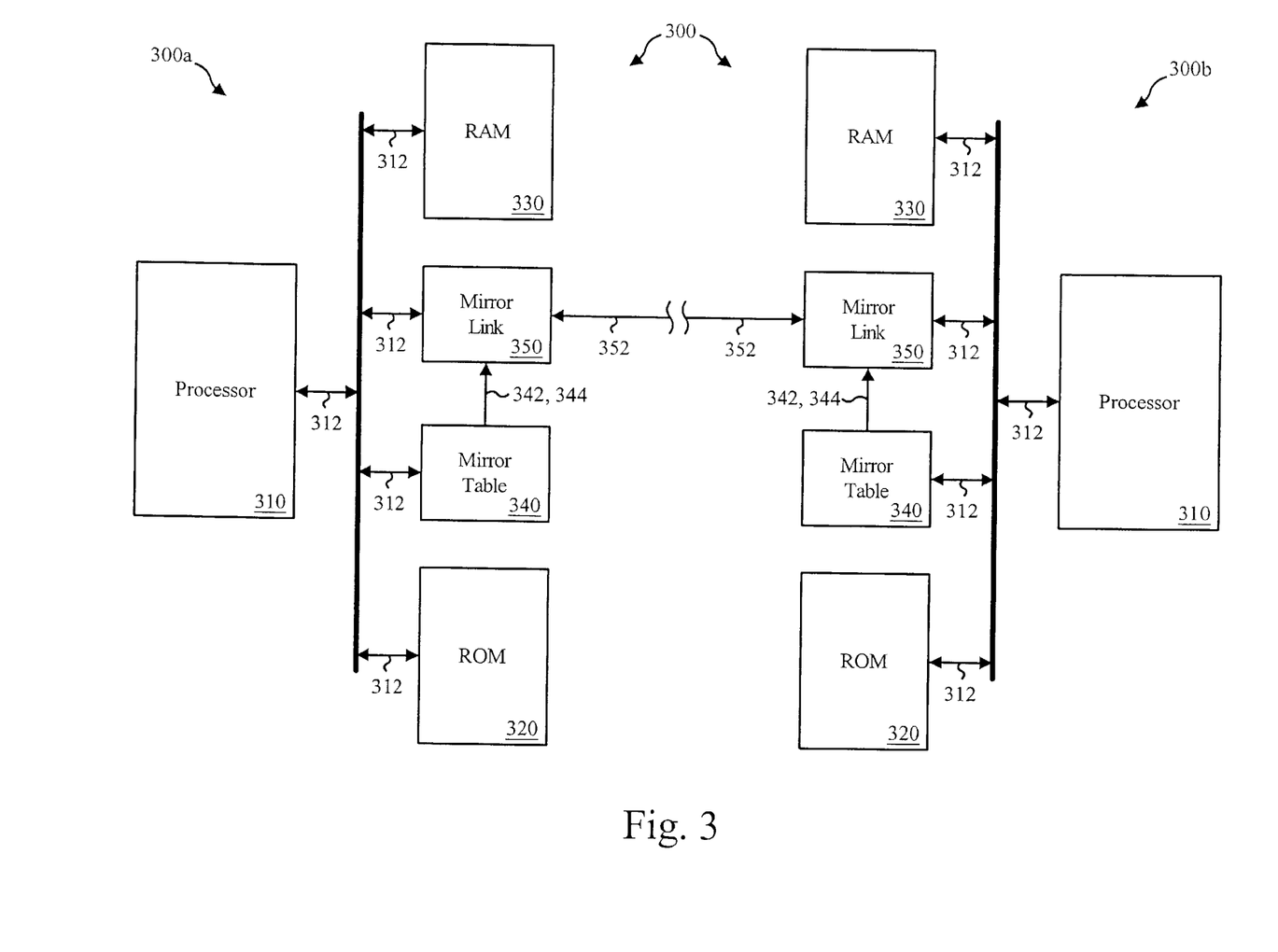
FIG. 3 is a block diagram illustrating one embodiment of a mirrored memory system of the present invention.

FIG. 3 is a block diagram illustrating one embodiment of a mirrored memory system 300. The mirrored memory system 300 facilitates mirroring of selected segments of data between a local system 300a and a remote system 300b. In the depicted embodiment, the local system 300a and the remote system 300b are essentially identical for illustration purposes.

In the depicted embodiment, the mirrored memory system 300 includes a processor 310, a memory bus 312, a program memory 320, and a data memory 330. In addition to the elements typical of digital processing systems, the mirrored memory system 300 includes a mirror table 340 and a mirror link 350. The mirror table 340 is preferably configured to map addresses within selected local memory segments to addresses within corresponding remote memory segments. One advantage of the mirror table 340 is that the number of segments that are mapped may be a small subset of the available segments. In operation, the mirror table 340 receives addresses from the memory bus 312 and provides a remote address 342 to the mirror link 350. In certain embodiments, the mirror table 340 also provides additional data 344 such as a segment descriptor.

The mirror link 350 receives the remote address 342 along with corresponding data from the memory bus 312 and in turn provides an update packet 352. In one embodiment, the update packet includes the remote address 342, corresponding data from the memory bus 312, and the additional data 344. The mirror link 350 also receives the update packets 352 from non-local systems. The received update packets are decoded to provide addresses within local memory segments to the memory bus 312 along with corresponding data. The ability to send and receive the update packets 352 facilitates data coherency between a plurality of memory systems such as the local system 300a and the remote system 300b.

Figure 4:
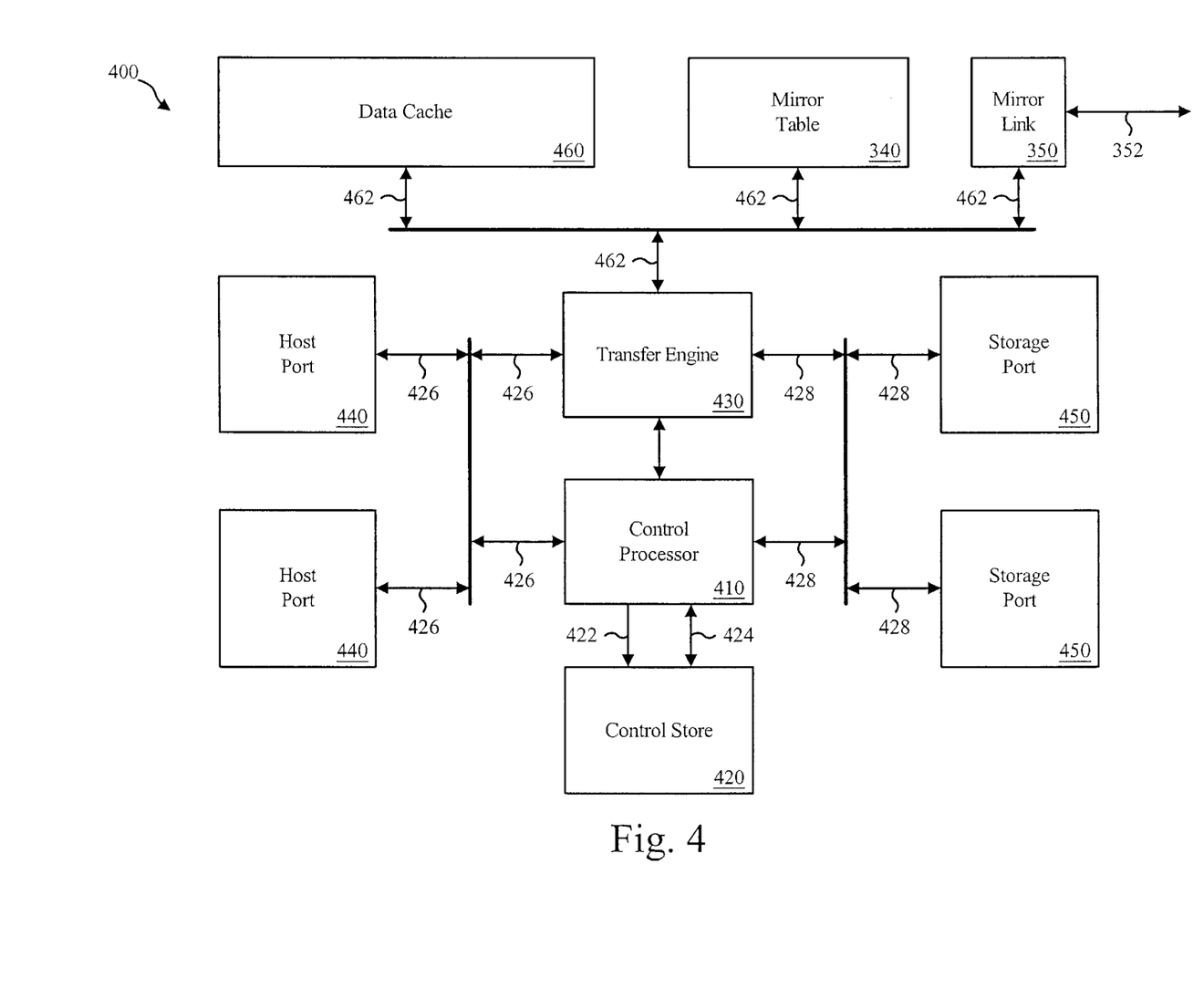
FIG. 4 is a block diagram illustrating one embodiment of a mirrored memory RAID controller of the present invention.

FIG. 4 is a block diagram illustrating one embodiment of a mirrored memory RAID controller 400 of the present invention. The mirrored memory RAID controller 400 is preferably configured to support fault-tolerant systems with data redundancy, active standby and load sharing capabilities. Within the RAID controller 400, a control processor 410 accesses data from a control store 420 via an address bus 422 and a data bus 424. The control processor 410 also configures various devices and accesses configuration information.

A host-side data bus 426 and a storage-side data bus 428 are high performance data buses that facilitate the transfer of blocks of data between one or more hosts and a storage array such as the storage array 210. In one embodiment, a transfer engine 430 executes the actual transfers within the RAID controller 400 and provides or checks redundancy fields on the transfer data depending of the direction of the transfer.

One or more host ports 440 and one or more storage ports 450 provide access to hosts and storage arrays respectively. A data cache 460 stores and caches data blocks and provides an intermediate transfer point for the transfer engine 430. The transfer engine 430 accesses the data cache 460 through a data cache bus 462.

The mirrored memory RAID controller 400 also includes the mirror table 340 and the mirror link 350. In the depicted embodiment, the mirror table 340 and the mirror link 350 operate in the manner described in conjunction with the mirrored memory system 300 of FIG. 3. The mirror table 340 and the mirror link 350 work together to capture, assemble, transmit, receive, disassemble and present the elements of the update packets 352. The functions executed by the mirror table 340 and the mirror link 350 within the RAID controller 400 effectively mirror selected memory segments and maintain data coherency between redundant RAID controllers.

Figure 5:
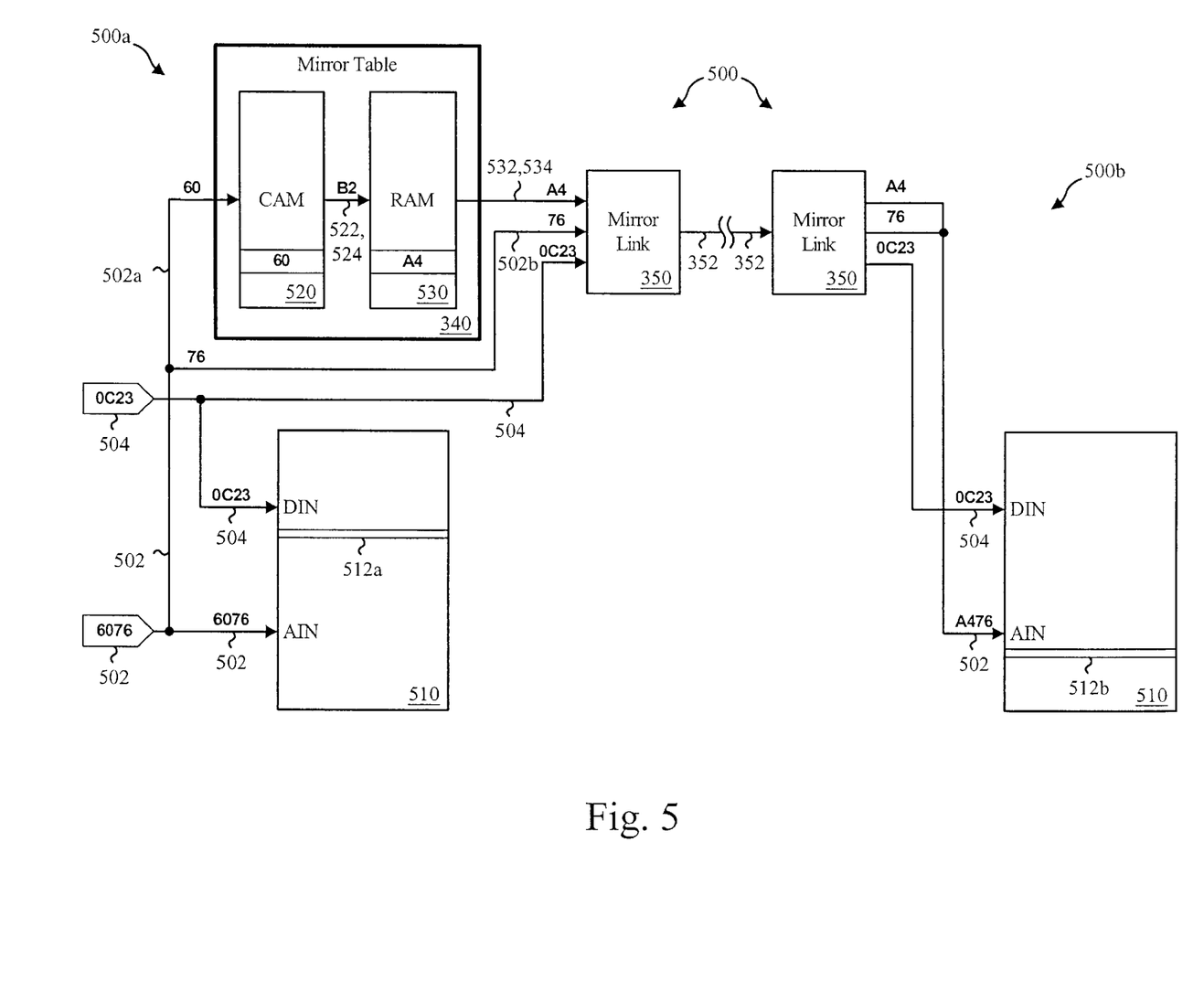
FIG. 5 is a block diagram illustrating one embodiment of a mirrored memory subsystem of the present invention.

FIG. 5 is a block diagram illustrating one embodiment of a mirrored memory subsystem 500 of the present invention. The mirror memory subsystem 500 of FIG. 5 includes a mirror table 340 of FIG. 3 shown in greater detail. FIG. 5 also depicts the flow of an example write operation from a local memory subsystem 500a to a remote memory subsystem 500b.

The mirrored memory subsystem 500 receives an address 502 and corresponding data 504, which in the depicted example are hexadecimal values 0x0C23 and 0x6076 respectively. The address 502 and corresponding data 504 are received by the memory 510 and written to a local memory location 512a corresponding to the address 502. Concurrently, the address 502 and the corresponding data 504 are also received by the mirror table 340 and the mirror link 350 to enable selective mirroring of the write operations received by the mirrored memory subsystem 500.

The mirror table 340 receives the upper portion of the address 502, a local segment address 502a. Within the mirror table 340 the local segment address 502a is compared by a CAM (content addressable memory) 520 to a plurality of local segment addresses stored within the CAM 520. If the local segment address 502a matches an address within the CAM 520, the CAM 520 provides a segment index 522 and asserts a segment hit signal 524. Otherwise, no segment index is provided and the segment hit signal 524 is not asserted. In the depicted example, the local segment address 502a has a hexadecimal value of 0x 60 and the CAM 520 has the hexadecimal value 0x 60 stored at location 0x B2 resulting in the CAM providing a segment index 522 with a hexadecimal value of 0x B2.

The segment index 522 is received by a RAM (random access memory) 530, which provides one or more remote segment addresses 532. In the depicted example, the RAM provides a remote segment address 532 with a hexadecimal value of 0x A4. The RAM 530 may also provide additional data 534 useful to the system in which it is deployed, for example, a segment descriptor or control information. In one embodiment, control information is provided that enables system resets, packet acknowledgements, packet retransmissions, and the like. The ability to provide control information increases the utility of the mirror table 340 and associated mirror link 350.

The mirror link 350 receives the remote segment addresses 532 as well as any additional data 534 such as segment descriptors and control information. The mirror link also receives the lower portion of the address 502, a segment offset 502b, and the corresponding data 504. The mirror link 350 assembles one or more remote segment addresses 532, the segment offset 502b, the corresponding data 504, and the additional data 534 into the update packet 352.

In addition to assembling the update packet 352, the update packet 352 is also transmitted by the mirror link 350. In the depicted example, the update packet 352 is transmitted by the mirror link 350 of the local memory subsystem 500a and received by the mirror link 350 of the remote memory subsystem 500b.

The received update packet 352 is disassembled into one or more remote segment addresses 532, the segment offset 502b, the corresponding data 504, and the additional data 534. The disassembled elements are used to update the memory 510 of the remote memory subsystem 500b at a remote memory location 512b. The remote memory location 512b is typically different than the local memory location 512a. In the depicted example, the remote memory location 0x A476 is updated with the hexadecimal value 0x 0C23.

The architecture of the mirror table 340 and the mirror link 350 enables a variety of solutions and embodiments. For example, in certain embodiments more than one remote memory segment address 532 is provided by the RAM 530. In these embodiments, multiple update packets 352 may be assembled and transmitted to multiple remote memory subsystems 500b. Alternately, a single update packet containing more than one remote memory segment address 532 may be assemble and transmitted to multiple remote memory subsystems 500b.

Figure 6:
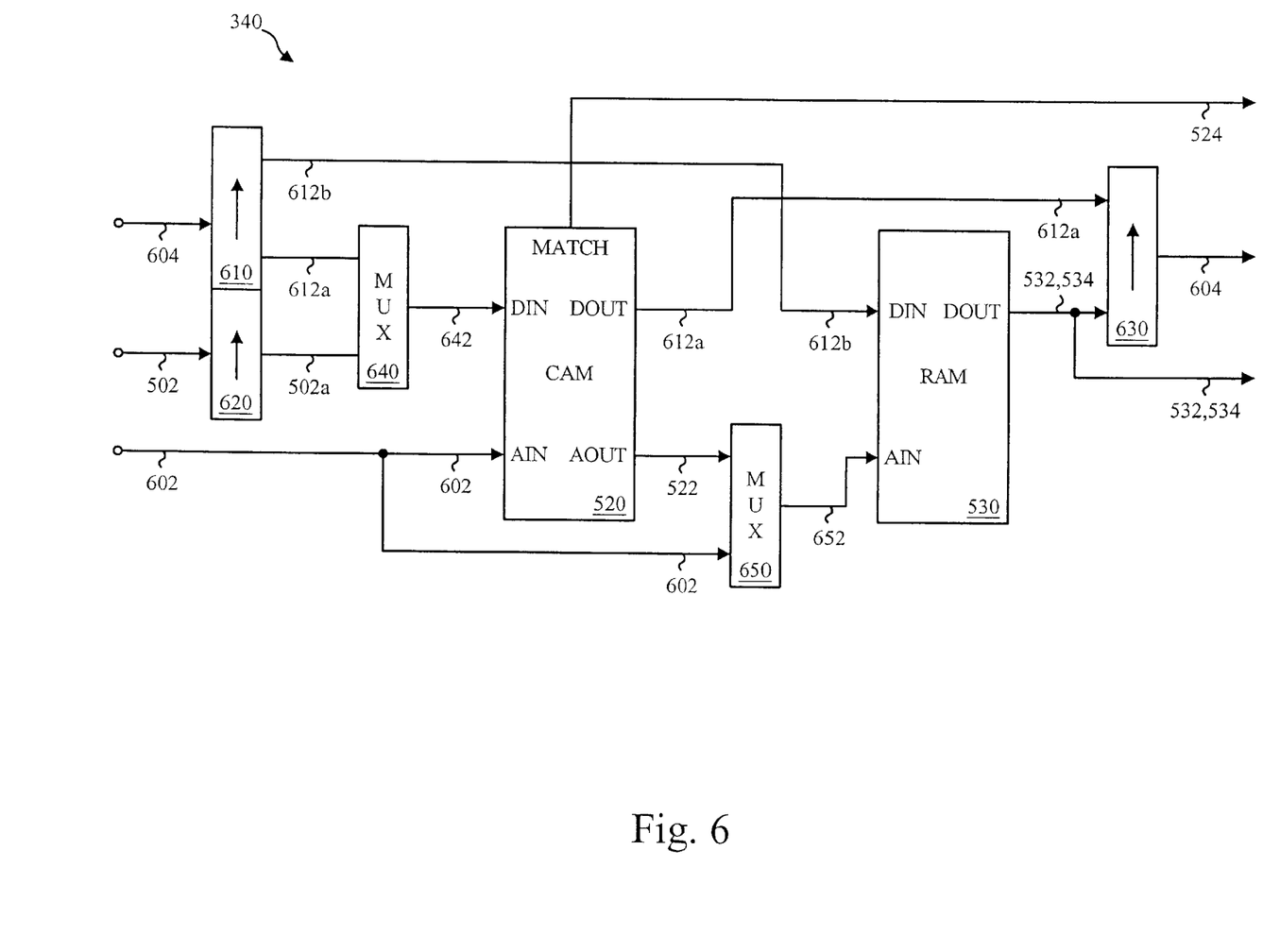
FIG. 6 is a block diagram illustrating one embodiment of a mirror table of the present invention.

FIG. 6 is a block diagram illustrating one embodiment of the mirror table 340 of the present invention. The depicted embodiment illustrates the mirror table 340 in greater detail and includes shifting and multiplexing elements that enable a selectable size for the local segment address 502a and the segment offset 502b. A selectable size facilitates changing the granularity of the selectably mirrored segments which may be conducted, for example, by a control processor during system boot.

The depicted embodiment includes a control bus comprising a control address 602 and control data 604 in addition to a memory bus (such as the memory bus 312 or the data cache bus 462), which provides the address 502. In the depicted embodiment, the control bus is used to directly access and update the mirror table i.e. the CAM 520 and the RAM 530.

In addition to the CAM 520 and the RAM 530, the depicted embodiment of the mirror table 340 includes shifters 610, 620, and 630, and multiplexors 640 and 650. The shifters 610, 620, and 630 align bits within certain data paths to and from normalized positions for storage within the CAM 520 and the RAM 530. The multiplexors 640 and 650 select the data and address fields appropriate to the particular operation being conducted.

A control address 602 is received by the CAM 520 to facilitate accessing individual entries in the CAM when the CAM is not operating in a content addressable mode. In the preferred embodiment, the CAM 520 ignores the control address 602 except during mirror table read and write operations.

TABLE 1

| Segment Size | # of Segments | Total Size | Segment Address Bits | Segment Offset Bits |
|---|---|---|---|---|
| 1M | 4K | 4G | 12 | 20 |
| 512K | 8K | 4G | 13 | 19 |
| 256K | 16K | 4G | 14 | 18 |
| 128K | 32K | 4G | 15 | 17 |
| 64K | 64K | 4G | 16 | 16 |
| 32K | 128K | 4G | 17 | 15 |
| 16K | 256K | 4G | 18 | 14 |
| 8K | 512K | 4G | 19 | 13 |
| 4K | 1M | 4G | 20 | 12 |
| 2K | 2M | 2G | 20 | 11 |
| 1K | 4M | 1G | 20 | 10 |

The shifter 610 receives control data 604 and provides shifted control data 612a and 612b. The shifter 620 receives the address 502 and provides the local segment address 502a. Shifting the control data 604 and the address 502 aligns the bits of interest to normalized bit positions. In one embodiment, the shifting of bits facilitates changing the granularity (i.e. the size) of the selectably mirrored segments as shown in Table 1.

The multiplexor 640 selects the shifted control data 612a or the local segment address 502a to provide CAM data 642. In the preferred embodiment, the multiplexor 640 selects the shifted control data 612a during mirror table write operations. Otherwise, the local segment address 502a is selected by the multiplexor 640, for example during normal operation when segment mirroring is active.

The CAM 520 receives the control address 602 and the CAM data 642. During normal operation the CAM provides the segment index 522 and the segment hit signal 524 as described with previous Figures. In the preferred embodiment, the CAM data 642 (i.e. the local segment address 502a) is written into the location designated by the control address 602 when conducting mirror table write operations. During such operations, the control address 602 effectively specifies the segment index 522.

As depicted, the multiplexor 650 selects either the control address 602 or the segment index 522 to provide a RAM address 652. In the preferred embodiment, the control address 602 is selected during mirror table write operations and the segment index 522 is selected during normal operation.

In the depicted embodiment, the RAM 530 receives the RAM address 652 and the shifted control data 612b. As depicted, the control address 602 is received by the RAM 530 when selected by the multiplexor 650. For example, in the preferred embodiment the control address 602 is selected by the multiplexor 650 during mirror table write operations enabling simultaneous updates to both the CAM 520 and the RAM 530. Likewise, in the preferred embodiment, the shifted control data 612b is written into the RAM 530 during mirror table write operations.

The RAM 530 provides the remote segment addresses 532 and the additional data 534. In the preferred embodiment, the remote segment addresses 532 and the additional data 534 are provided during mirror table read operations as well as normal write operations that result in a segment hit (i.e. assertion of the segment hit signal 524).

The shifter 630 receives the remote segment addresses 532, the additional data 534, and the shifted control data 612a, and shifts the bits to provide the control data 604. The shifter 630 realigns the data from normalized bit positions of the CAM 520 to the appropriate bit positions within the control data 604. The shifter 630 effectively unshifts the shifting conducted by the shifter 610 to provide the control data 604.

TABLE 2

Mirror Table Functional Summary

| Operation | CAM Activity | RAM Activity |
| --- | --- | --- |
| Mirror Table Write | Stores Local Segment Address at Segment Index | Stores Remote Segment Addresses and Additional Data from Control Bus |
| Mirror Table Read | Provides Segment Index to RAM and Local Segment Address to Control Bus | Provides Remote Segment Addresses and Additional Data to Control Bus |
| Read | Idle | Idle |
| Non-mirrored Write | De-asserts Hit Signal | Idle |
| Mirrored Write | Asserts Hit Signal and Provides Segment Index to RAM | Provides Remote Segment Addresses and Additional Data to Mirror Link |

Table 2 summarizes the functionality provided by the CAM 520 and the RAM 530, in the preferred embodiment, in relation to various memory operations performed by the mirror table 340. The summarized functionality of the mirror table 340 enables data coherency on selected memory segments when used in conjunction with the mirror link 350 or the like.

Figure 7A:
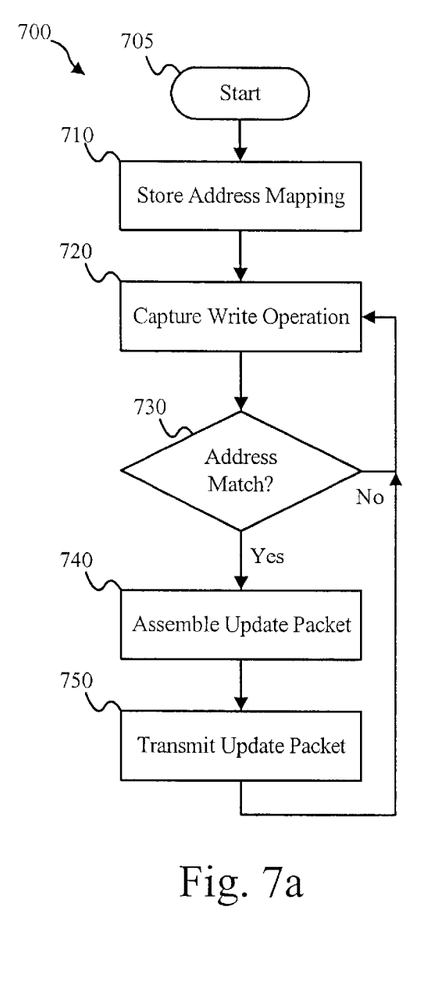
FIG. 7 is a flow chart illustrating one embodiment of a selective data coherency method of the present invention.

FIG. 7a is a flow chart illustrating one embodiment of a selective data coherency method 700 of the present invention. The selective data coherency method 700 may be conducted independent of, or in conjunction with, the mirror table 340 and the mirror link 350. The method starts 705 and proceeds by storing 710 one or more segment mappings. In one embodiment, the segment mappings comprise a local segment address and one or more remote segments addresses. The segment mappings are preferably stored within a mirror table such as the mirror table 340.

The selective data coherency method 700 proceeds by capturing 720 the address and data fields of a memory write operation followed by testing 730 whether the write operation is within a mapped segment. If so, the selective data coherency method 700 proceeds to assembling 740 an update packet. Otherwise, the method returns to capturing 720 memory write operations.

In one embodiment, assembling 740 an update packet comprises concatenating the remote segment addresses 532, the segment offset 502b, the corresponding data 504, and the additional data 534 into the update packet 352. After assembling 740, the method 700 proceeds by transmitting 750 the update packet. In one embodiment, transmitting 750 comprises transmitting the update packet 352 to a remote system such as the remote system 300b.

Figure 7B:
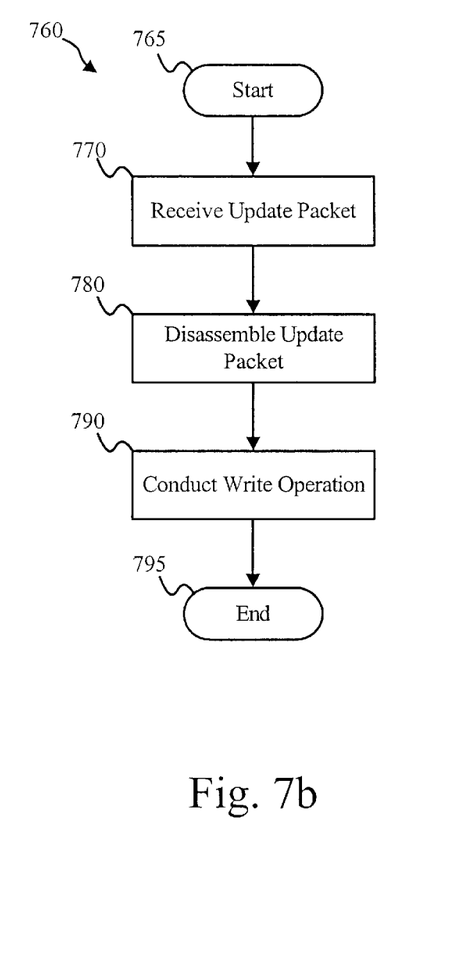

FIG. 7b is a flow chart illustrating one embodiment of a coherency update method 760 of the present invention. The coherency update method 760 complements the selective data coherency method 700 to maintain selective coherency between a local system and one or more remote systems. The coherency update method 760 may be conducted independent of, or in conjunction with, the mirror link 350.

The method 760 proceeds from starting 765 to receiving 770 an update packet such as the update packet 352. After receiving 770, the coherency update method 760 proceeds by disassembling 780 the update packet into the various constituent elements that comprise the update packet. In one embodiment, the constituent elements include the remote segment address 532, the segment offset 502b, the corresponding data 504, and the additional data 534.

The method 760 proceeds from disassembling 780 to conducting 790 a write operation with the data received in the update packet. In one embodiment, conducting the write operation updates an address location specified by the remote segment address 532 and the segment offset 502b, with the corresponding data 504. After conducting 790 a write operation, the coherency update method 760 terminates 795.

Figure 8:
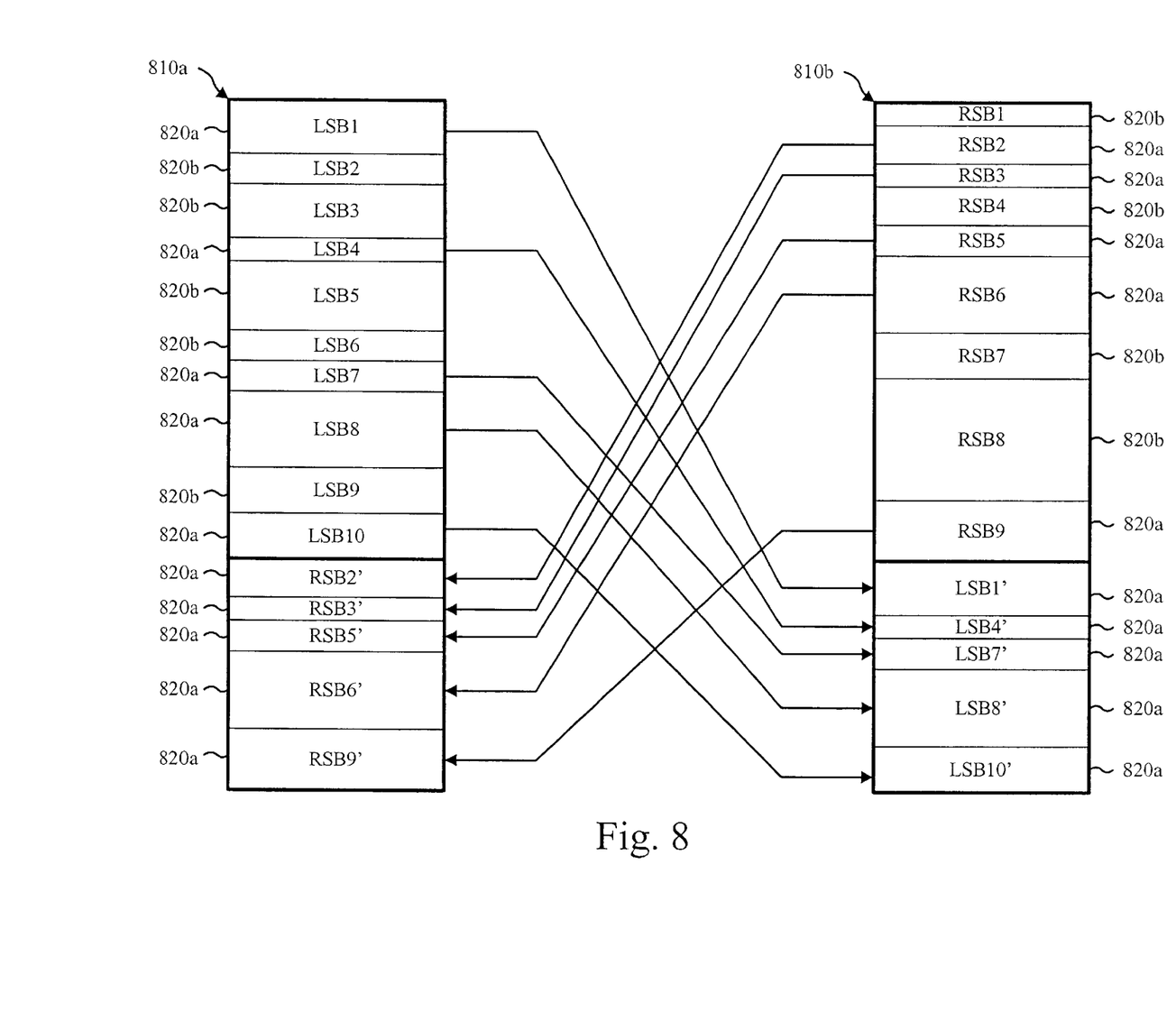
FIG. 8 is a block diagram depicting one example of results of the selective data coherency method of the present invention.

FIG. 8 is a block diagram depicting example results from the selective data coherency method 700 and the coherency update method 760 of the present invention. Selected segments from a local memory 810a are mirrored to a remote memory 810b. Additionally, in the depicted example, selected segments from the remote memory 810b are mirrored to the local memory 810a.

In the depicted example multiple segments are clustered into contiguous blocks 820 for clarity purposes. Some of the blocks are mirrored blocks 820a, while others are non-mirrored blocks 820b. The granularity of the blocks 820 is determined by the size of the segments.

In the depicted example, the blocks 820 and the segments from which they are comprised maintain their relative order and occupy a contiguous section of memory separate from the original data of each memory space. In actual usage, for example when memory is dynamically allocated, the mirrored segments may be randomly interspersed among non-mirrored segments within each memory. In one embodiment of the present invention, processes that request dynamically allocated memory specify whether the allocated memory is to be mirrored to a remote memory and the memory allocation routines manage the entries in the mirror table.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for selectively maintaining data coherency between local memory segments within a local memory and corresponding remote memory segments within a remote memory, the apparatus comprising:

a random access memory (RAM) configured to store remote addresses of respective remote memory segments;

a content addressable memory (CAM) configured to store addresses of respective local memory segments to be mirrored to respective remote memory segments, and to store indexes into said RAM for respective local memory segments;

means, responsive to update of data in said local memory, for determining from said CAM if said data was updated in one of said local memory segments, and if so, determining from said CAM an index into said RAM for said one local memory segment; and means, responsive to said index, for identifying from said RAM a remote address corresponding to said one local memory segment, and transmitting to said remote memory said corresponding remote address along with said data such that said data updated in said local memory segment is mirrored to the corresponding remote memory segment.

2. The apparatus of claim 1, wherein the CAM and the RAM include means for enabling access to both an address within said CAM and a corresponding address within said RAM within a single memory cycle.

3. The apparatus of claim 1, wherein said local memory is a local cache, said remote memory is a remote cache, and only some addresses within said local cache are mirrored to said remote cache by said CAM.

4. The apparatus of claim 1, wherein a size of the local memory segments is independent of a size of the remote memory segments.

5. An apparatus for selectively maintaining data coherency between local memory segments and memory segments within at least one remote memory, the apparatus comprising:

a content addressable memory (CAM) configured to store a local segment address for a plurality of mirrored segments and to provide a segment index when presented with a segment address stored therein;

a random access memory (RAM) configured to store at least one remote segment address for the plurality of mirrored segments and to provide the at least one remote segment address when presented with the segment index; and a mirror link configured to receive the at least one remote segment address along with corresponding data and transmit each remote segment address and corresponding data to a remote memory.

6. The apparatus of claim 5, wherein the RAM is further configured to store additional data and the mirror link is further configured to receive and transmit the additional data.

7. The apparatus of claim 5, wherein the CAM and the RAM are further configured to enable access to both the local segment address and the at least one remote segment address with a single memory cycle.

8. The apparatus of claim 5, wherein a size of the local memory segments is selectable.

9. The apparatus of claim 5, wherein a size of the local memory segments is independent of a size of the memory segments within at least one remote memory.

10. An apparatus selectively maintaining data coherency between local memory segments and memory segments within at least one remote memory, the apparatus comprising:

a content addressable memory (CAM) configured to store a local segment address for a plurality or mirrored segments of a selectable size and to provide a segment index when presented with a segment address stored therein;

a random access memory (RAM) configured to store additional data and at least one remote segment address for the plurality of mirrored segments and to provide the additional data and the at least one remote segment address when presented with the segment index;

a mirror link configured to receive the additional data and the at least one remote segment address along with corresponding data and transmit the additional data and each remote segment address along with corresponding data to a remote memory; and the CAM and the RAM further configured to enable access to both the local segment address and the at least one remote segment address with a single memory cycle.

11. A method for selectively maintaining data coherency between local memory segments within a local memory and corresponding remote memory segments within a remote memory, said method comprising the steps of:

storing, within or local to said local memory, remote addresses of respective remote memory segments;

storing, within or local to said local memory, addresses of respective local memory segments to be mirrored to respective remote memory segments, and indexes into the stored remote addresses for respective local memory segments;

in response to update of data in said local memory, determining from the stored addresses of said local memory segments if said data was updated in one of said local memory segments, and if so, determining from the stored indexes an index into the stored remote addresses for said one local memory segment; and in response to said index, determining from the stored remote addresses a remote address corresponding to said one local memory segment, and transmitting to said remote memory said corresponding remote address along with said data such that said data updated in said local memory segment is mirrored to the corresponding remote memory segment.

12. The method of claim 11, wherein the steps of determining from the stored addresses of said local memory segments if said data was updated in one of said local memory segments and determining from the stored remote addresses a remote address corresponding to said one local memory segment are both performed within a single memory cycle.

13. The method of claim 11, further comprising the step of selecting a size of the local memory segments.

14. The method of claim 11, wherein a size of the local memory segments is independent of a size of the remote memory segments.

15. A system for selectively mirroring data between dual active raid controllers, the system comprising:

a first RAID controller comprising a mirror table and a mirror link, the mirror table configured to selectively map local addresses to remote addresses, the mirror link configured to transmit a mapped address and corresponding data to a second RAID controller, the second RAID controller configured to receive the mapped address and corresponding data and to store the data at a memory location indicated by the mapped address; and wherein the mirror table comprises:

a content addressable memory (CAM) configured to store a local segment address for a plurality of mirrored segments and to provide a segment index when presented with a segment address stored therein; and a random access memory (RAM) configured to store a remote segment address for the plurality of mirrored segments and to provide the remote segment address when presented with the segment index.

* * * * *